(12) United States Patent
Liu et al.

(10) Patent No.: US 11,853,516 B2
(45) Date of Patent: Dec. 26, 2023

(54) PROTECTIVE ASSEMBLY AND TOUCH MODULE

(71) Applicant: TPK Advanced Solutions Inc., Fujian (CN)

(72) Inventors: Jen-Chang Liu, Tainan (TW); Xiang Mei Chen, Xiamen (CN); Lian Jie Ji, Xiamen (CN); Lien-Hsin Lee, Taipei (TW); Tai-Shih Cheng, Taipei (TW)

(73) Assignee: TPK ADVANCED SOLUTIONS INC., Fujian (CN)

( * ) Notice: Subject to any disclaimer, the term of this patent is extended or adjusted under 35 U.S.C. 154(b) by 93 days.

(21) Appl. No.: 17/550,424

(22) Filed: Dec. 14, 2021

(65) Prior Publication Data

US 2023/0185410 A1 Jun. 15, 2023

(51) Int. Cl.
| G06F 3/044 | (2006.01) |
| B32B 7/12 | (2006.01) |
| B32B 27/28 | (2006.01) |
| B32B 27/30 | (2006.01) |
| B32B 27/36 | (2006.01) |
| B32B 27/38 | (2006.01) |
| B32B 27/08 | (2006.01) |

(52) U.S. Cl.
CPC .............. *G06F 3/0443* (2019.05); *B32B 7/12* (2013.01); *B32B 27/08* (2013.01); *B32B 27/283* (2013.01); *B32B 27/308* (2013.01); *B32B 27/365* (2013.01); *B32B 27/38* (2013.01); *G06F 3/0446* (2019.05); *B32B 2255/20* (2013.01); *B32B 2307/412* (2013.01); *B32B 2307/54* (2013.01); *B32B 2307/732* (2013.01); *B32B 2457/208* (2013.01); *G06F 2203/04111* (2013.01)

(58) Field of Classification Search
CPC ........ G06F 3/0443; G06F 3/044; G06F 3/042; G06F 3/0446; G06F 2203/04111; B32B 7/12; B32B 27/08; B32B 27/283; B32B 27/308; B32B 27/365; B32B 27/38; B32B 2255/20; B32B 2307/412; B32B 2307/54; B32B 2307/732; B32B 2457/208
See application file for complete search history.

(56) References Cited

U.S. PATENT DOCUMENTS

| 2006/0214287 A1* | 9/2006 | Ogihara | ..................... B41J 2/45 |
| | | | 257/723 |
| 2011/0006419 A1* | 1/2011 | Hirano | ................... C09J 7/0246 |
| | | | 428/323 |
| 2013/0257264 A1* | 10/2013 | Tamaki | ................... F21V 13/08 |
| | | | 313/503 |

(Continued)

FOREIGN PATENT DOCUMENTS

CN 100378541 C 4/2008

*Primary Examiner* — Pegeman Karimi
(74) *Attorney, Agent, or Firm* — Cooper Legal Group, LLC

(57) ABSTRACT

A protective assembly includes a cover plate, a buffer layer, and a flexible substrate. The buffer layer is disposed on the cover plate and made of transparent polymer. The buffer layer has a light transmittance greater than about 85%, a thickness ranging from about 3 μm to about 15 μm, and a Poisson's ratio greater than about 0.4. The flexible substrate is disposed on the buffer layer and doped with an inorganic compound. The flexible substrate has a thickness ranging from about 3 μm to about 10 μm and a Young's coefficient ranging from about 1 GPa to about 10 GPa.

20 Claims, 6 Drawing Sheets

(56) References Cited

U.S. PATENT DOCUMENTS

| | | | |
|---|---|---|---|
| 2015/0195921 A1* | 7/2015 | Onodera | H05K 3/4691 |
| | | | 174/258 |
| 2018/0007799 A1* | 1/2018 | Jeong | H05K 3/38 |
| 2019/0163009 A1* | 5/2019 | Lee | G02B 5/003 |
| 2020/0089355 A1* | 3/2020 | Moon | G06F 3/0412 |
| 2020/0103561 A1* | 4/2020 | Li | B32B 27/065 |
| 2020/0315488 A1* | 10/2020 | Rogers | A61B 5/1107 |
| 2021/0265193 A1* | 8/2021 | Aizawa | C09J 7/385 |
| 2021/0373219 A1* | 12/2021 | Zhu | G02B 1/14 |
| 2023/0060220 A1* | 3/2023 | Han | G02F 1/133548 |

* cited by examiner

PROTECTIVE ASSEMBLY AND TOUCH MODULE

BACKGROUND

Technical Field

The present disclosure relates to a protective assembly and a touch module.

Description of Related Art

The durability requirements for touch panels in electronic devices are getting higher and higher. In addition to breakthrough development in the major performances of touch sensitivity and display refresh rate, how to further have anti-drop and anti-impact design is a key point that needs to be explored in more depth.

According to China Patent Application Publication No. CN 100378541C, in order to increase the hardness, wear resistance, and impact resistance of the cover plate, the use of a composite protective substrate including a buffer layer and a sapphire substrate, which can be applied to a touch sensing device, is disclosed. However, the sapphire material has the disadvantages of being prone to cracks and not having flexibility.

Accordingly, how to provide a protective assembly and a touch module to solve the aforementioned problems becomes an important issue to be solved by those in the industry.

SUMMARY

An aspect of the disclosure is to provide a protective assembly and a touch module that can efficiently solve the aforementioned problems.

According to an embodiment of the disclosure, a protective assembly includes a cover plate, a buffer layer, and a flexible substrate. The buffer layer is disposed on the cover plate and made of transparent polymer. The buffer layer has a light transmittance greater than about 85%, a thickness ranging from about 3 μm to about 15 μm, and a Poisson's ratio greater than about 0.4. The flexible substrate is disposed on the buffer layer and doped with an inorganic compound. The flexible substrate has a thickness ranging from about 3 μm to about 10 μm and a Young's coefficient ranging from about 1 GPa to about 10 GPa.

In an embodiment of the disclosure, the Poisson's ratio of the buffer layer is greater than about 0.5.

In an embodiment of the disclosure, the buffer layer has an elongation ranging from about 200% to about 1600%.

In an embodiment of the disclosure, at least one of the buffer layer or the flexible substrate has a decomposition temperature greater than about 340 degrees Celsius.

In an embodiment of the disclosure, at least one of the buffer layer or the flexible substrate has a maximum service temperature greater than about 350 degrees Celsius.

In an embodiment of the disclosure, the inorganic compound includes graphene, diamond, or a mixture thereof.

In an embodiment of the disclosure, the inorganic compound includes graphene oxide ranging from about 100 ppm to about 1000 ppm.

In an embodiment of the disclosure, the protective assembly further includes a bonding layer. The bonding layer bonds the cover plate and the buffer layer and has a thickness ranging from about 10 nm to about 100 nm.

In an embodiment of the disclosure, a material of the bonding layer includes epoxy functional silane, amine functional silane, or thiol functional silane.

In an embodiment of the disclosure, a material of the buffer layer includes polydimethylsiloxane, polymethylmethacrylate, or polycarbonate.

In an embodiment of the disclosure, a material in the buffer layer includes epoxy-functional organic, amino-functional organic, or thiol-functional organic.

In an embodiment of the disclosure, a material in the flexible substrate includes epoxy-functional organic or thiol-functional organic.

According to another embodiment of the disclosure, a touch module includes the protective assembly, a bridging pattern layer, and an electrode pattern layer. The bridging pattern layer is disposed on a side of the flexible substrate away from the cover plate and includes a plurality of bridging electrodes. The electrode pattern layer is disposed above the bridging pattern layer and includes a first transparent conductive layer, a metal layer, and a second transparent conductive layer which are sequentially stacked and respectively have a first resistance value, a second resistance value, and a third resistance value.

In an embodiment of the disclosure, the electrode pattern layer has two through hole regions directly above one of the bridging electrodes. The touch module further includes a first insulating layer and a second insulating layer. The first insulating layer is disposed between the bridging pattern layer and the electrode pattern layer and has two exposed regions. The electrode pattern layer is electrically connected to the one of the bridging electrodes through the two exposed regions. The second insulating layer is disposed on the electrode pattern layer and covers and fills the two through hole regions.

In an embodiment of the disclosure, the first insulating layer includes a first insulating block and a second insulating block respectively formed at opposite ends of the one of the bridging electrodes, and the first insulating layer comprises a third insulating block separately located between the first insulating block and the second insulating block by the two exposed regions.

In an embodiment of the disclosure, the electrode pattern layer includes two first electrode blocks and a second electrode block. The first electrode blocks are electrically connected to the one of the bridging electrodes respectively through the two exposed regions. The second electrode block is separately located between the two first electrode blocks by the two through hole regions.

In an embodiment of the disclosure, the first transparent conductive layer is a first transparent oxide conductive layer, and the second transparent conductive layer is a second transparent oxide conductive layer.

In an embodiment of the disclosure, at least one of the first transparent oxide conductive layer or the second transparent oxide conductive layer has a first region and a second region. An oxygen content of the first region is greater than an oxygen content of the second region.

In an embodiment of the disclosure, the second region is located between the first region and the metal layer.

Accordingly, in the protective assembly of the present disclosure, with the elasticity provided by the buffer layer and the high Young's coefficient provided by the flexible substrate, an impact can be resisted when subjected to the impact, so that the touch function of the touch module can still be exerted. In addition, the touch module of the present disclosure also uses a composite touch electrode to cooperate with the protective assembly. Therefore, the composite touch electrode not only can resist the impact by the protective assembly to maintain the touch function, but also effectively reduce the impedance to increase the touch refresh rate.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
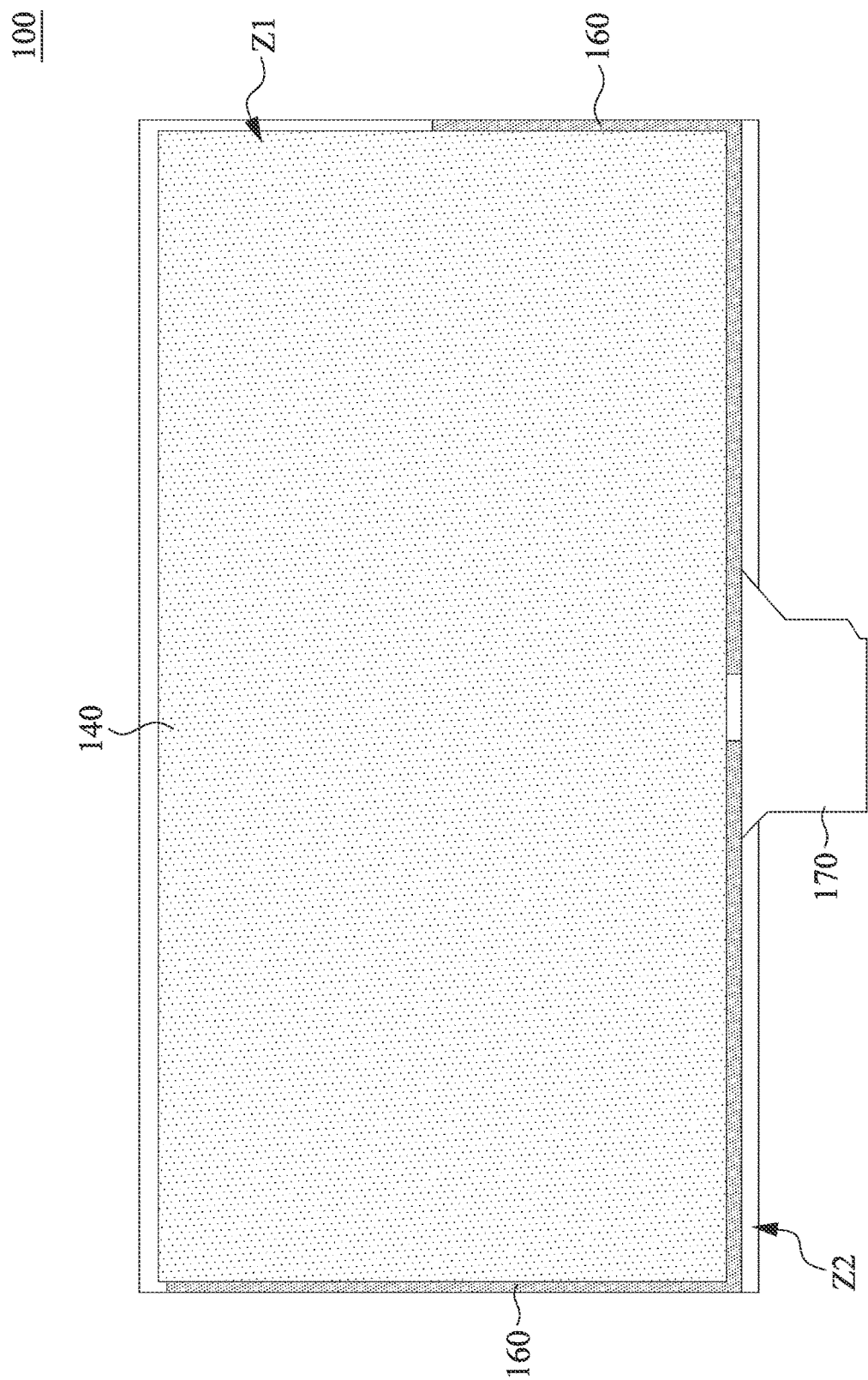
FIG. 1 is a schematic diagram of a touch module according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a schematic diagram of a touch module 100 according to an embodiment of the present disclosure. As shown in FIG. 1, in the present embodiment, the touch module 100 includes a flexible substrate 110, a touch electrode layer, a plurality of traces 160, and a flexible circuit board 170. The flexible substrate 110 defines a touch zone Z1 and a peripheral zone Z2 thereon. The peripheral zone Z2 is located at the outer edge of the touch zone Z1. The touch electrode layer is disposed in the touch zone Z1. The traces 160 are located in the peripheral zone Z2, and two ends of each of the traces 160 are respectively connected to the touch electrode layer and the flexible circuit board 170, so as to transmit touch signals generated by the touch electrode layer to the flexible circuit board 170.

Figure 2:
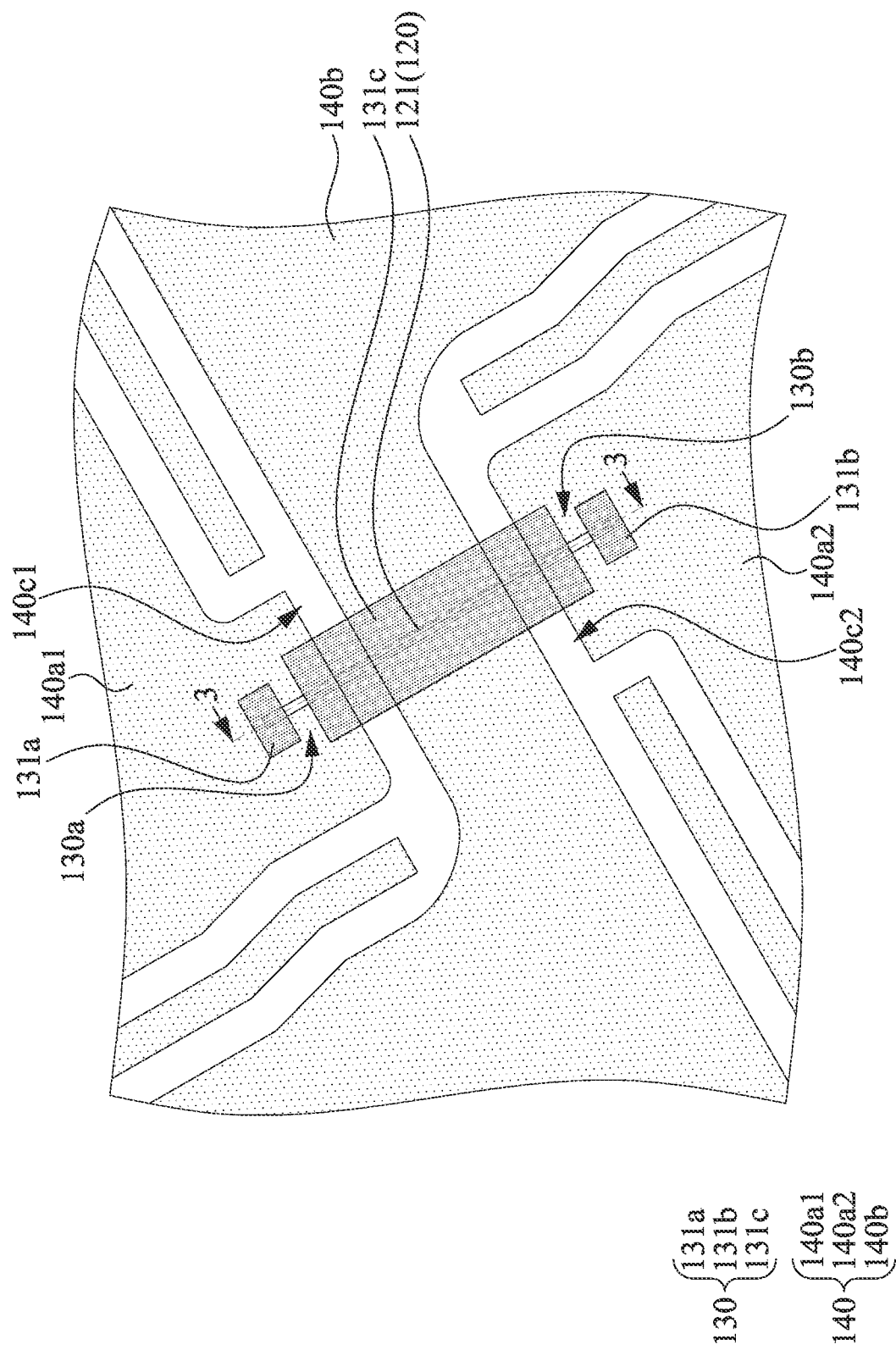
FIG. 2 is a partial enlarged view of the touch module in FIG. 1.
Figure 3:
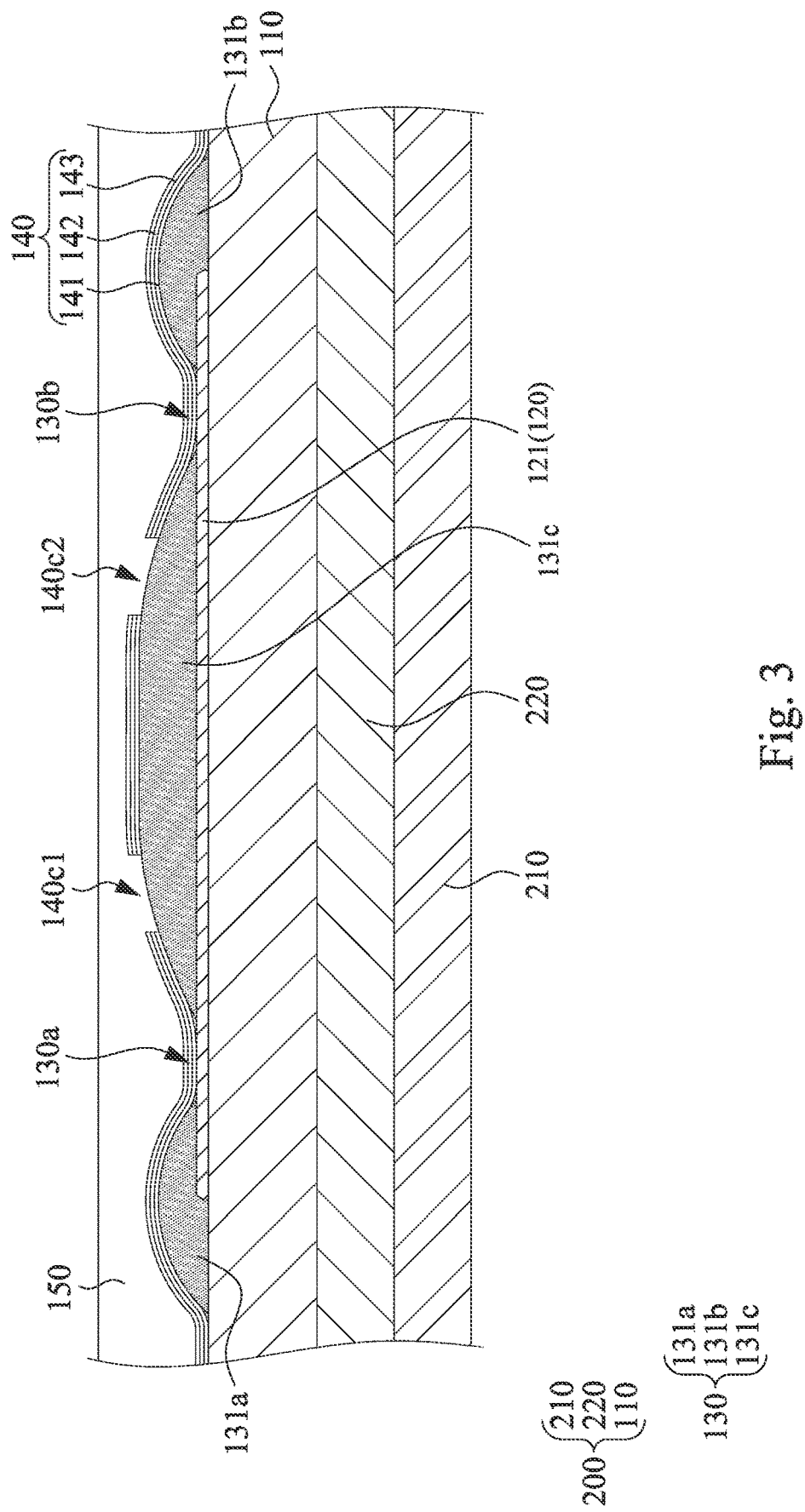
FIG. 3 is a cross-sectional view of the structure in FIG. 2 taken along line 3-3.

Reference is made to FIGS. 2 and 3. FIG. 2 is a partial enlarged view of the touch module 100 in FIG. 1. FIG. 3 is a cross-sectional view of the structure in FIG. 2 taken along line 3-3. The area depicted in FIG. 2 is located in the touch zone Z1. As shown in FIGS. 2 and 3, in the present embodiment, the touch electrode layer includes a bridging pattern layer 120 and an electrode pattern layer 140. The touch module 100 further includes a first insulating layer 130 and a second insulating layer 150. The bridging pattern layer 120 is disposed on the flexible substrate 110 and includes a plurality of bridging electrodes 121. Hereinafter, one of the bridging electrodes 121 is used for description. The first insulating layer 130 is disposed on the bridging pattern layer 120 and has two exposed regions 130a, 130b respectively adjacent to opposite ends of the bridging electrode 121. The electrode pattern layer 140 is disposed on the first insulating layer 130, and is electrically connected to the bridging electrode 121 through the exposed regions 130a, 130b. The electrode pattern layer 140 has two through hole regions 140c1, 140c2 directly above the bridging electrode 121. The second insulating layer 150 is disposed on the electrode pattern layer 140, and the second insulating layer 150 covers and fills the through hole regions 140c1, 140c2.

In some embodiments, a thickness of the first insulating layer 130 is about 1.25 μm, and a thickness of the second insulating layer 150 is about 2 μm, but the disclosure is not limited in this regard.

In detail, as shown in FIGS. 2 and 3, in the present embodiment, the electrode pattern layer 140 includes two first electrode blocks 140a1, 140a2 and a second electrode block 140b. The first electrode blocks 140a1, 140a2 are electrically connected to the bridging electrode 121 respectively through the exposed regions 130a, 130b. The second electrode block 140b is separately located between the first electrode blocks 140a1, 140a2 by the through hole regions 140c1, 140c2. Hence, the two first electrode blocks 140a1, 140a2 can transmit touch signals through the bridging electrode 121, and the two first electrode blocks 140a1, 140a2 are electrically isolated from the second electrode block 140b.

In some embodiments, the electrode pattern layer 140 includes a plurality of first-axis conductive units spaced apart from each other and a plurality of second-axis conductive units spaced apart from each other and across the first-axis conductive units. Specifically, the aforementioned "first-axis" and "second-axis" respectively are, for example, two axes (for example, the Y axis and the X axis) that are perpendicular to each other. In other words, the first-axis conductive units are conductive lines extending along the first axis and arranged at intervals. The combination of the two first electrode blocks 140a1, 140a2 and the bridging electrode 121 is a part of one of the first-axis conductive units. The second-axis conductive units are conductive lines extending along the second axis and arranged at intervals. The second electrode block 140b is one of the second-axis conductive units, which crosses the opposite sides of the bridging electrode 121 (with the first insulating layer 130 therebetween). It can be seen that the through hole regions 140c1, 140c2 cross the opposite sides of the first insulating layer 130, and the through hole regions 140c1, 140c2 divide the electrode pattern layer 140 into the first electrode blocks 140a1, 140a2 and the second electrode block 140b.

As shown in FIG. 3, in the present embodiment, the electrode pattern layer 140 includes a first transparent oxide conductive layer 141 (i.e., a first transparent conductive layer), a metal layer 142, and a second transparent oxide conductive layer 143 (i.e., a second transparent conductive layer) that are sequentially stacked and respectively have a first resistance value, a second resistance value, and a third resistance value. The first resistance value and the third resistance value are greater than the second resistance value. By forming the touch electrode layer with the electrode pattern layer 140 having the composite conductive structure, the resistance of the circuits (e.g., the first-axis conductive units and the second-axis conductive units) in the touch module 100 can be effectively reduced, so that the touch module 100 is suitable for use in medium and large-sized products.

In some embodiments, materials of the first transparent oxide conductive layer 141 and the second transparent oxide conductive layer 143 include indium tin oxide (ITO). Hence, the first transparent oxide conductive layer 141 and the second transparent oxide conductive layer 143 can have good light transmittance. In some embodiments, a material of the metal layer 142 includes silver, but the disclosure is not limited in this regard. In some embodiments, the metal layer 142 may be a nano-silver ink layer, a nano-silver paste layer, or a nano-sputter layer, but the disclosure is not limited in this regard. Hence, the metal layer 142 can have a lower resistance than the first transparent oxide conductive layer 141 and the second transparent oxide conductive layer 143.

In some embodiments, a thickness of the first transparent oxide conductive layer 141 is about 40 nm, but the present disclosure is not limited in this regard. In some embodiments, a thickness of the metal layer 142 is about 8.5 nm to about 9.5 nm, but the disclosure is not limited in this regard. In some embodiments, a thickness of the second transparent oxide conductive layer 143 is about 40 nm, but the disclosure is not limited in this regard.

As shown in FIGS. 2 and 3, in the present embodiment, the first insulating layer 130 includes a first insulating block 131a and a second insulating block 131b respectively formed at the opposite ends of the bridging electrode 121, and the first insulating layer 130 includes a third insulating block 131c separately located between the first insulating block 131a and the second insulating block 131b by the exposed regions 130a, 130b. In detail, the first insulating block 131a and the second insulating block 131b respectively cover the opposite ends of the bridging electrode 121 without exposing the bridging electrode 121. The first insulating block 131a, the third insulating block 131c, and the second insulating block 131b sequentially cover the bridging electrode 121 along the extending direction of the bridging electrode 121. The exposed regions 130a, 130b are respectively formed between the first insulating block 131a and the third insulating block 131c and between the third insulating block 131c and the second insulating block 131b. In addition, as shown in FIG. 3, the first insulating block 131a, the second insulating block 131b, and the third insulating block 131c have slopes. Specifically, the first insulating block 131a, the second insulating block 131b, and the third insulating block 131c are shaped like hills with slopes.

With the aforementioned structural configurations, the problem of cracks in the electrode pattern layer 140 disposed on the first insulating layer 130 can be effectively improved. Specifically, since the electrode pattern layer 140 is located above the opposite ends of the bridging electrode 121 by climbing up the first insulating block 131a and the second insulating block 131b, the problem of the electrode pattern layer 140 being cracked at the opposite ends of the bridging electrode 121 can be effectively improved.

As shown in FIG. 2, in the present embodiment, the exposed regions 130a, 130b are across the opposite sides of the bridging electrode 121. Hence, the contact areas between the first electrode blocks 140a1, 140a2 of the electrode pattern layer 140 and the bridging electrode 121 can be increased, thereby reducing the impedance.

Figure 4:
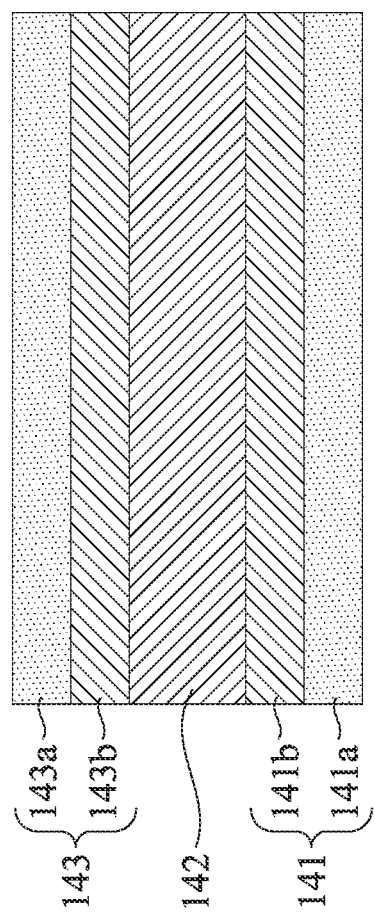
FIG. 4 is a partial cross-sectional view of an electrode pattern layer in FIG. 2.

Reference is made to FIG. 4. FIG. 4 is a partial cross-sectional view of the electrode pattern layer 140 in FIG. 2. As shown in FIG. 4, in the present embodiment, the first transparent oxide conductive layer 141 has a first region 141a and a second region 141b. An oxygen content of the first region 141a is greater than an oxygen content of the second region 141b. The second region 141b of the first transparent oxide conductive layer 141 is located between the first region 141a and the metal layer 142. The second transparent oxide conductive layer 143 has a first region 143a and a second region 143b. The second region 143b of the second transparent oxide conductive layer 143 is located between the first region 143a and the metal layer 142. With the aforementioned structural configurations, the first transparent oxide conductive layer 141 and the second transparent oxide conductive layer 143 can effectively have high transmittance and low impedance.

Table 1 below is a table of process parameters for manufacturing the electrode pattern layer 140 of Examples A to C.

TABLE 1

| | Layer 1 | | Layer 2 | | Layer 3 | Layer 4 | | Layer 5 | |
| --- | --- | --- | --- | --- | --- | --- | --- | --- | --- |
| | oxygen flux (sccm) | Power (kW) | oxygen flux (sccm) | Power (kW) | Power (kW) | oxygen flux (sccm) | Power (kW) | oxygen flux (sccm) | Power (kW) |
| A | 1.0 | 5.1 | 1.0 | 5.1 | 1.0 | 1.0 | 5.1 | 1.0 | 5.1 |
| B | 0.3 | 5.1 | 0.3 | 5.1 | 1.0 | 0.3 | 5.1 | 0.3 | 5.1 |
| C | 1.0 | 5.1 | 0.3 | 5.1 | 1.0 | 1.0 | 0.3 | 1.0 | 5.1 |

It should be noted that the process parameters of the layer 1 and the layer 2 in Table 1 are used when manufacturing the first region 141a and the second region 141b of the first transparent oxide conductive layer 141, respectively. The process parameters of the layer 3 are used when manufacturing the metal layer 142. The process parameters of the layer 4 and the layer 5 are used when manufacturing the second region 143b and the first region 143a of the second transparent oxide conductive layer 143, respectively. It can be seen from Table 1 above that when manufacturing the first transparent oxide conductive layer 141 and the second transparent oxide conductive layer 143 of Example A, the first regions 141a, 143a and the second regions 141b, 143b are made of high oxygen flux (that is, 1.0 sccm). When manufacturing the first transparent oxide conductive layer 141 and the second transparent oxide conductive layer 143 of Embodiment B, the first regions 141a, 143a and the second regions 141b, 143b are made of low oxygen flux (that is, 0.3 sccm). When manufacturing the first transparent oxide conductive layer 141 and the second transparent oxide conductive layer 143 of Example C, the first regions 141a, 143a are both made of high oxygen flux (that is, 1.0 sccm), and the second regions 141b, 143b are both made of low oxygen flux (that is, 0.3 sccm).

The Table 2 below is a table of physical parameters of the electrode pattern layer 140 of Examples A to C.

TABLE 2

|   | Optical parameters | | | | Square resistance after baking Ohms per square (ops) |
| --- | --- | --- | --- | --- | --- |
|   | T % | Haze | L* | a* | b* |   |
| A | 89.1 | 0.19 | 26.28 | 4.50 | 1.53 | 7.09 |
| B | 87.0 | 0.26 | 26.36 | 11.15 | 2.04 | 6.79 |
| C | 87.6 | 0.24 | 25.96 | 9.64 | 0.78 | 6.70 |

T % represents a percentage of visible light (having a wavelength between 380 to about 750 nanometers) being transmitted through the electrode pattern layer 140 (i.e., a light transmittance through the electrode pattern layer 140). L*, a*, and b* are components in CIELAB color space, where L* defines black at 0 and white at 100, a* axis is relative to the green-red opponent colors, with negative values toward green and positive values toward red, and b* axis represents the blue-yellow opponents, with negative numbers toward blue and positive toward yellow.

As shown in FIG. 3, in the present embodiment, the touch module 100 further includes a protective assembly 200. The protective assembly 200 includes a cover plate 210, a buffer layer 220, and the flexible substrate 110. The buffer layer 220 is disposed on a side of the flexible substrate 110 away from the bridging pattern layer 120 and located between the cover plate 210 and the flexible substrate 110. The buffer layer 220 is made of transparent polymer. The buffer layer 220 has a light transmittance greater than about 85%, a thickness ranging from about 3 µm to about 15 µm, and a Poisson's ratio greater than about 0.4. The flexible substrate 110 has a thickness ranging from about 3 µm to about 10 µm, and preferably from about 3 µm to about 6 µm. The flexible substrate 110 is doped with an inorganic compound to have a Young's coefficient ranging from about 1 GPa to about 10 GPa. The aforementioned thickness limitation is to make the touch module 100 suitable for folding applications.

In some embodiments, the Poisson's ratio of the buffer layer 220 is greater than about 0.5.

In some embodiments, the buffer layer 220 has an elongation ranging from about 200% to about 1600%.

In some embodiments, at least one of the buffer layer 220 or the flexible substrate 110 has a decomposition temperature greater than about 340 degrees Celsius. In some embodiments, at least one of the buffer layer 220 or the flexible substrate 110 has a maximum service temperature greater than about 350 degrees Celsius. Hence, the protective assembly 200 can withstand the high-temperature process when manufacturing the electrode pattern layer 140.

In some embodiments, a main material of the flexible substrate 110 preferably includes colorless polyimide (CPI), but the present disclosure is not limited in this regard.

In some embodiments, the inorganic compound includes graphene, diamond, or a mixture thereof.

In some embodiments, the inorganic compound includes graphene oxide ranging from about 100 ppm to about 1000 ppm, and preferably from about 300 ppm to about 500 ppm.

In some embodiments, a component material in the flexible substrate 110 includes epoxy-functional organic or thiol-functional organic. The purpose is to increase the compatibility of the inorganic compound. In addition, acetic acid can also be added to prevent premature gelation.

In some embodiments, a main material of the buffer layer 220 includes polydimethylsiloxane (PDMS), polymethylmethacrylate (PMMA), or polycarbonate (PC), and preferably includes polydimethylsiloxane, but the present disclosure is not limited in this regard.

The Table 3 below is a table of parameters of physical, mechanical, and chemical properties of various materials.

TABLE 3

| Main item | Subitem | PDMS | PC | PMMA | CPI |
| --- | --- | --- | --- | --- | --- |
| Physical | Transmittance | >90% | >88% | >90% | >88% |
|   | Decomposition temperature | >340° C. | 420° C. | 170° C. | 400° C. |
|   | Maximum service temperature | 350° C. | 130° C. |   | 350° C. |
| Mechanical | Elongation | 200-1600% | 66-140% | 2-6% | 7-95% |
|   | Poisson's ratio | 0.50 | 0.42 | 0.40 | 0.15-0.42 |
| Chemical | Acid Dilute/concentrated | Good | Good/Poor | Poor | Good/Poor |
|   | Alkalis | Good | Good-Poor | Poor | Good-Poor |
|   | Aliphatic hydrocarbons | Good | Good | Good-Poor | Good |
|   | Aromatic hydrocarbons | Good-Poor | Poor | Poor | Good |

As can be seen from the above table, PDMS and CPI perform better in the items of physical, mechanical, and chemical properties, so PDMS and CPI have better ability to withstand high-temperature or corrosive processes. In other words, the material of the buffer layer 220 can be preferably PDMS, and the material of the flexible substrate 110 can preferably be CPI.

In some embodiments, a component material in the buffer layer 220 also includes epoxy-functional organic, amino-functional organic, or thiol-functional organic. In some embodiments, the buffer layer 220 includes a PDMS-Epoxy composite material. In some embodiments, a ratio of PDMS to Epoxy is about 3:2 to about 1:1, and IPA-xylene solvent is used. It is worth noting that in addition to isopropanol (IPA), it is necessary to rely on water to help hydrolyze and use acetic acid to inhibit premature gelation.

Figure 5:
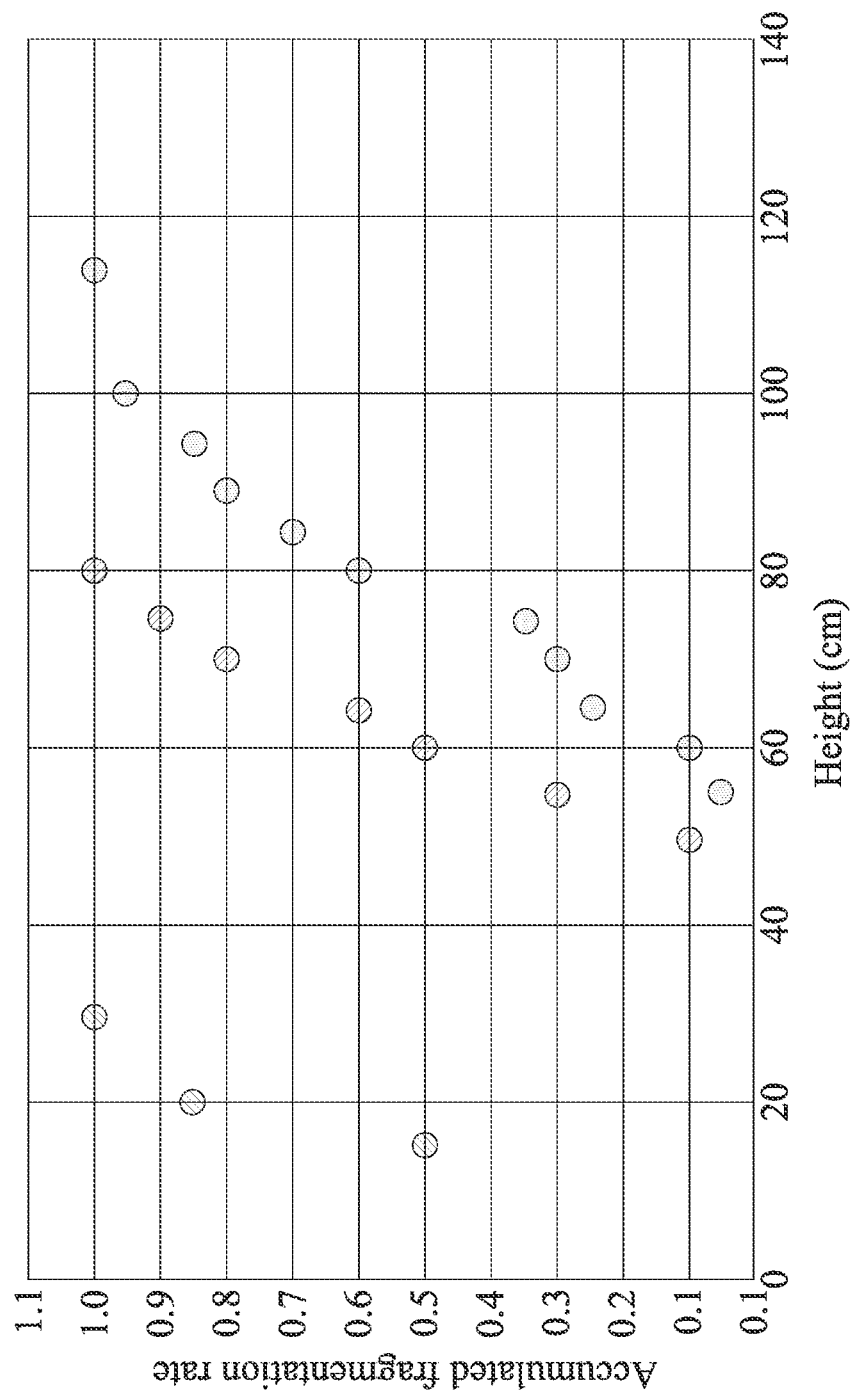
FIG. 5 is a graph showing a drop ball test of protective assemblies of different embodiments.

Reference is made to FIG. 5. FIG. 5 is a graph showing a drop ball test of protective assemblies 200 of different embodiments. It should be noted that Embodiment 1 is an embodiment in which the touch module 100 omits the buffer layer 220 and the flexible substrate 110 is not doped with the inorganic compound. Embodiment II is an embodiment in which the touch module 100 omits the buffer layer 220 and the flexible substrate 110 is doped with the inorganic compound. Embodiment III is the touch module 100 including the protective assembly 200 as shown in FIG. 3. As shown in FIG. 5, the embodiment III can significantly increase the ball drop height compared to the embodiments I and II.

It can be seen from the above configuration that the protective assembly 200 of the present embodiment can benefit from the elasticity provided by the buffer layer 220 and the high Young's coefficient provided by the flexible substrate 110. In this way, the protective assembly 200 can resist an impact when subjected to the impact, so that the touch function of the touch module 100 can still be exerted.

Figure 6:
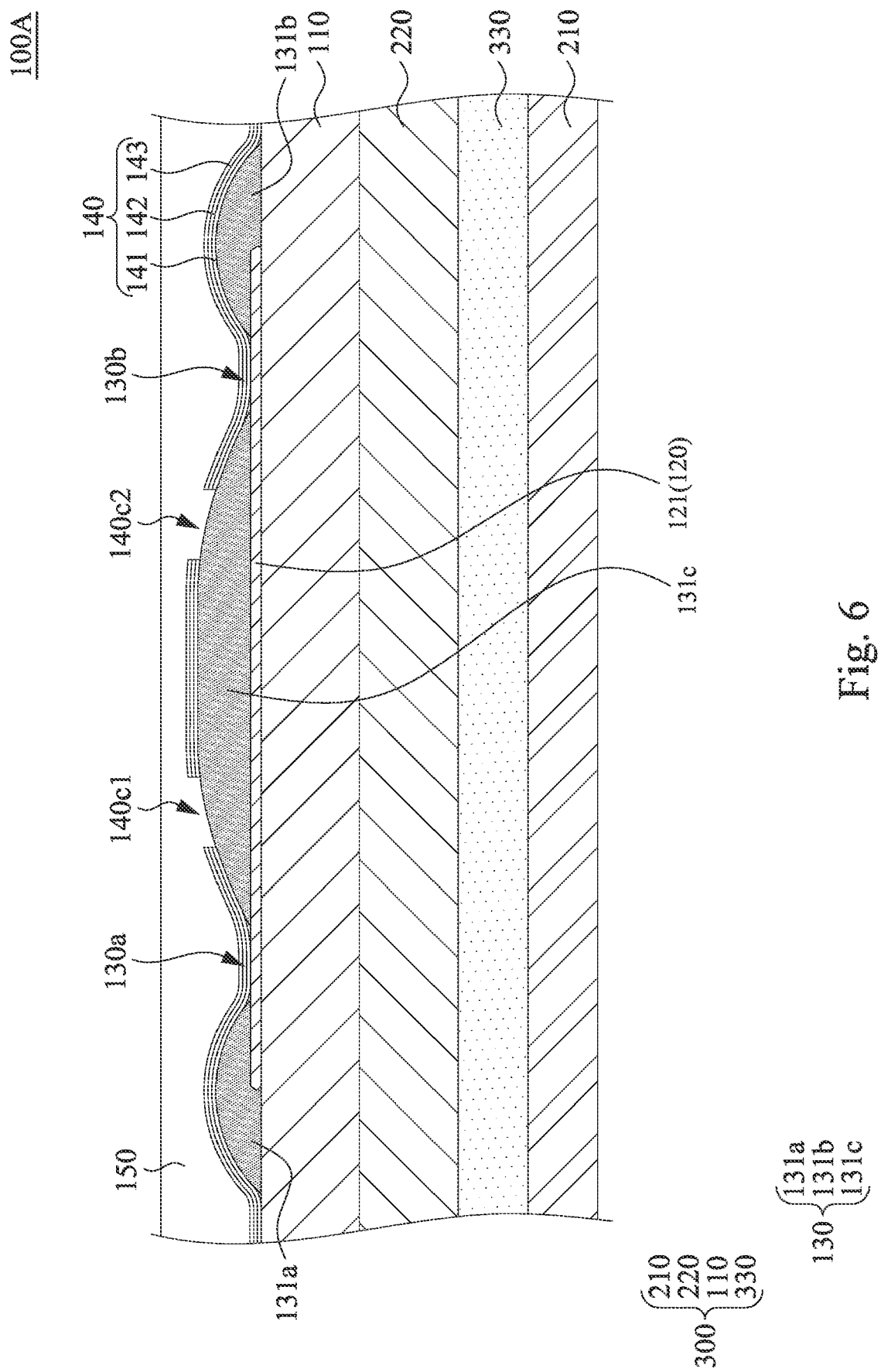
FIG. 6 is a cross-sectional view of a touch module according to another embodiment of the present disclosure.

Reference is made to FIG. 6. FIG. 6 is a cross-sectional view of a touch module 100A according to another embodiment of the present disclosure. As shown in FIG. 6, the present embodiment is modified for the protective assembly 200 of the touch module 100 shown in FIG. 3. Specifically, the protective assembly 300 of the present embodiment further includes a bonding layer 330. The bonding layer 330 bonds the cover plate 210 and the buffer layer 220 and has a thickness ranging from about 10 nm to about 100 nm, and preferably from about 40 nm to about 60 nm. The purpose of the bonding layer 330 (primer) is to better serve as a bonding medium between the cover plate 210 and the buffer layer 220.

In some embodiments, a material of the bonding layer 330 includes epoxy functional silane, amine functional silane, or thiol functional silane, but the present disclosure is not limited in this regard.

According to the foregoing recitations of the embodiments of the disclosure, it can be seen that in the protective assembly of the present disclosure, with the elasticity provided by the buffer layer and the high Young's coefficient provided by the flexible substrate, an impact can be resisted when subjected to the impact, so that the touch function of the touch module can still be exerted. In addition, the touch module of the present disclosure also uses a composite touch electrode to cooperate with the protective assembly. Therefore, the composite touch electrode not only can resist the impact by the protective assembly to maintain the touch function, but also effectively reduce the impedance to increase the touch refresh rate.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A protective assembly, comprising:
a cover plate;
a buffer layer disposed on the cover plate and made of transparent polymer, the buffer layer having a light transmittance greater than 85%, a thickness ranging from 3 μm to 15 μm, and a Poisson's ratio greater than 0.4; and
a flexible substrate disposed on the buffer layer and doped with an inorganic compound, the flexible substrate having a thickness ranging from 3 μm to 10 μm and a Young's coefficient ranging from 1 GPa to 10 GPa, wherein the inorganic compound comprises graphene oxide ranging from 100 ppm to 1000 ppm.

2. The protective assembly of claim 1, wherein the Poisson's ratio of the buffer layer is greater than 0.5.

3. The protective assembly of claim 1, wherein the buffer layer has an elongation ranging from 200% to 1600%.

4. The protective assembly of claim 1, wherein at least one of the buffer layer or the flexible substrate has a decomposition temperature greater than 340 degrees Celsius.

5. The protective assembly of claim 1, wherein at least one of the buffer layer or the flexible substrate has a maximum service temperature greater than 350 degrees Celsius.

6. The protective assembly of claim 1, further comprising a bonding layer bonding the cover plate and the buffer layer and having a thickness ranging from 10 nm to 100 nm.

7. The protective assembly of claim 6, wherein a material of the bonding layer comprises epoxy functional silane, amine functional silane, or thiol functional silane.

8. The protective assembly of claim 1, wherein a material of the buffer layer comprises polydimethylsiloxane, polymethylmethacrylate, or polycarbonate.

9. The protective assembly of claim 1, wherein a material in the buffer layer comprises epoxy-functional organic, amino-functional organic, or thiol-functional organic.

10. The protective assembly of claim 1, wherein a material in the flexible substrate comprises epoxy-functional organic or thiol-functional organic.

11. A touch module, comprising:
the protective assembly of claim 1;
a bridging pattern layer disposed on a side of the flexible substrate away from the cover plate and comprising a plurality of bridging electrodes; and
an electrode pattern layer disposed above the bridging pattern layer and comprising a first transparent conductive layer, a metal layer, and a second transparent conductive layer which are sequentially stacked and respectively have a first resistance value, a second resistance value, and a third resistance value.

12. The touch module of claim 11, wherein the electrode pattern layer has two through hole regions directly above one of the bridging electrodes, and the touch module further comprises:
a first insulating layer disposed between the bridging pattern layer and the electrode pattern layer and having two exposed regions, wherein the electrode pattern layer is electrically connected to the one of the bridging electrodes through the two exposed regions; and
a second insulating layer disposed on the electrode pattern layer and covering and filling the two through hole regions.

13. The touch module of claim 12, wherein the first insulating layer comprises a first insulating block and a second insulating block respectively formed at opposite ends of the one of the bridging electrodes, and the first insulating layer comprises a third insulating block separately located between the first insulating block and the second insulating block by the two exposed regions.

14. The touch module of claim 12, wherein the electrode pattern layer comprises:
two first electrode blocks electrically connected to the one of the bridging electrodes respectively through the two exposed regions; and
a second electrode block separately located between the two first electrode blocks by the two through hole regions.

15. The touch module of claim 11, wherein the first transparent conductive layer is a first transparent oxide conductive layer, and the second transparent conductive layer is a second transparent oxide conductive layer.

16. The touch module of claim 15, wherein at least one of the first transparent oxide conductive layer or the second transparent oxide conductive layer has a first region and a second region, and an oxygen content of the first region is greater than an oxygen content of the second region.

17. The touch module of claim 16, wherein the second region is located between the first region and the metal layer.

18. A touch module, comprising:
a protective assembly, comprising:
    a cover plate;
    a buffer layer disposed on the cover plate and made of transparent polymer, the buffer layer having a light transmittance greater than 85%, a thickness ranging from 3 μm to 15 μm, and a Poisson's ratio greater than 0.4; and
    a flexible substrate disposed on the buffer layer and doped with an inorganic compound, the flexible substrate having a thickness ranging from 3 μm to 10 μm and a Young's coefficient ranging from 1 GPa to 10 GPa
a bridging pattern layer disposed on a side of the flexible substrate away from the cover plate and comprising a plurality of bridging electrodes; and
an electrode pattern layer disposed above the bridging pattern layer and comprising a first transparent conductive layer, a metal layer, and a second transparent conductive layer which are sequentially stacked and respectively have a first resistance value, a second resistance value, and a third resistance value.

19. The touch module of claim 18, wherein the electrode pattern layer has two through hole regions directly above one of the bridging electrodes, and the touch module further comprises:
    a first insulating layer disposed between the bridging pattern layer and the electrode pattern layer and having two exposed regions, wherein the electrode pattern layer is electrically connected to the one of the bridging electrodes through the two exposed regions; and
    a second insulating layer disposed on the electrode pattern layer and covering and filling the two through hole regions.

20. The touch module of claim 19, wherein the first insulating layer comprises a first insulating block and a second insulating block respectively formed at opposite ends of the one of the bridging electrodes, and the first insulating layer comprises a third insulating block separately located between the first insulating block and the second insulating block by the two exposed regions.

* * * * *